United States Patent [19]

Schubert

[11] 4,082,006

[45] Apr. 4, 1978

[54] POSTAGE METER CONVERSION APPARATUS

[75] Inventor: Keith E. Schubert, Rowayton, Conn.

[73] Assignee: Pitney-Bowes, Inc., Stamford, Conn.

[21] Appl. No.: 728,302

[22] Filed: Sep. 30, 1976

[51] Int. Cl.[2] .............. F16H 27/02

[52] U.S. Cl. .............. 74/89.2

[58] Field of Search .............. 74/89.2, 89.21, 89.22; 235/101

[56] References Cited

U.S. PATENT DOCUMENTS

| | | | |
|---|---|---|---|
| 3,539,063 | 10/1970 | Masura | 74/89.2 |
| 3,596,673 | 8/1971 | Laucournet | 74/89.2 |
| 3,732,742 | 5/1973 | Castaldi | 74/89.2 |
| 3,771,375 | 11/1973 | Niernielstein | 74/89.2 |
| 3,848,798 | 11/1974 | Riley | 235/101 |

*Primary Examiner*—Samuel Scott

*Assistant Examiner*—Wesley S. Ratliff, Jr.

*Attorney, Agent, or Firm*—Robert S. Salzman; William D. Soltow, Jr.; Albert W. Scribner

[57] ABSTRACT

A postage meter attachment or conversion apparatus is disclosed that will effectively convert a manually lever settable postage meter into an electrically controlled postage meter. The conversion apparatus is easily assembled to and disassembled from a standard lever settable postage meter. Each lever of the meter is settable simultaneously. The motion of the drive mechanism of the conversion apparatus conforms to the arcuate motion of the meter setting levers, thus eliminating the need for precise alignment between the levers and the drive mechanism. The conversion apparatus can be used to make the mechanical meter compatible in an electrical environment containing equipment such as a computer, a digital scale, and other postage system processing devices.

7 Claims, 1 Drawing Figure

POSTAGE METER CONVERSION APPARATUS

This invention pertains to postal equipment, and more particularly to a conversion or attachment unit for making a standard manually settable postage meter compatible in an electrical environment.

BACKGROUND OF THE INVENTION

With more and more processing equipment becoming electrically controlled, a need is emerging for converting mechanical postal systems and equipment to electrical control.

Because present federal law prevents the direct electrical redesign of a postage meter, the invention concerns itself with the logical alternative, viz., a conversion attachment.

While conversion attachments are not new per se, the present invention features a novel mechanism packaged as a unit which provides ease of adaptability, assembly, reliability and low cost of manufacture.

RELATED APPLICATION

A postage meter conversion unit not unlike the present invention is illustrated in patent application Ser. No. 705,477; filed July 15, 1976. This prior apparatus set each lever of the postage meter in a simultaneous manner, but because of the mismatch in the drive and lever motions, required precise alignment of the drive and levers. The present inventive unit provides a drive unit which has a matching arcuate motion with that of the setting levers of the postage meter.

SUMMARY OF THE INVENTION

The invention relates to a postage meter conversion or attachment apparatus for converting a manually lever settable mechanical postage meter to an electrically controlled postage meter.

The inventive conversion unit comprises a drive motor for each meter order or bank. A number of belt mechanisms are each rotatively driven by a respective motor. As each belt mechanism is driven, a respective lever of a meter bank is caused to move arcuately to a postage value position. A lever of each postage meter bank is respectively connected to an arcuately supported portion of an endless belt of each belt mechanism. The motion of the belt mechanism is compatible with the arcuate motion of the meter levers, over its arcuately supported portion.

The motors are generally operated simultaneously to provide a quick setting of postage. Appropriate electronics may be designed into the system such that each bank need not be zeroed. In other words, each bank may be set directly from a previous position or setting.

Because the motion of the belts over their arcuately supported portion conforms to the arcuate motion of the meter levers, the levers can be easily supported by the belt and the conversion apparatus may be made vertically more compact as a result.

The levers each fit within an aperture provided in a respective belt.

The conversion unit is easily assembled to the postage meter and its surrounding housing. The conversion apparatus allows the mechanical meter to be electrically controlled by a computer or a digital scale, etc.

It is an object of this invention to provide an improved conversion apparatus for operating a mechanical postage meter by electrical control;

It is another object of the invention to provide a conversion unit for a postage meter which is easy to assemble;

It is a further object of this invention to provide a reliable low cost conversion unit for electrically controlling a standard mechanical postage meter.

These and other objects of the invention will become more apparent and will be better understood with reference to the following detailed description taken in conjunction with the attached drawing, in which:

FIG. 1 is a perspective view of the conversion apparatus of the invention.

DETAILED DESCRIPTION

Figure 1:
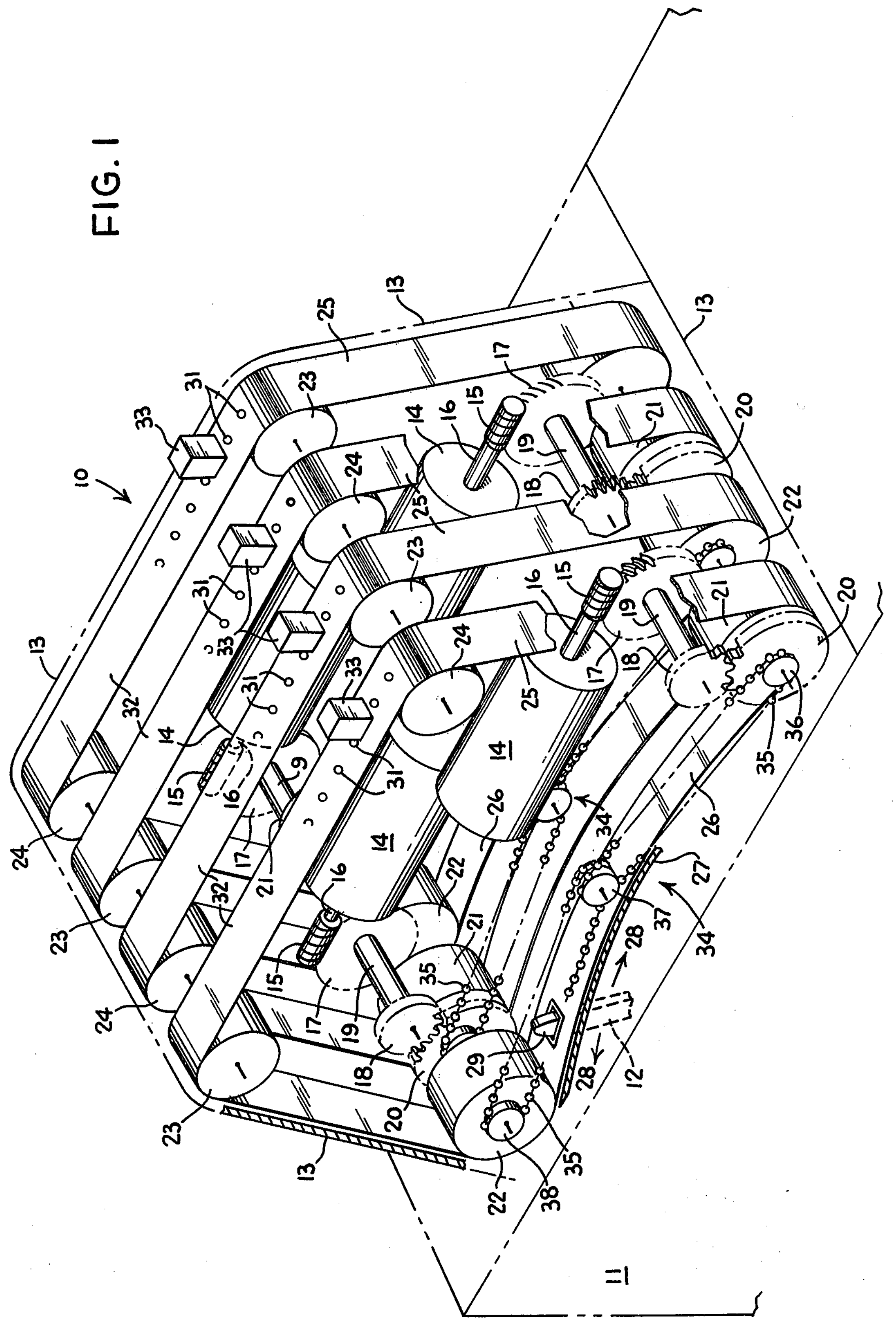

Now referring to FIG. 1 the conversion unit 10 of this invention is shown in mounted relationship to a postage meter 11 having a number of setting levers 12. The postage meter 11 is generally one of a type in a series designated as the 5300 Model Series manufactured by the present assignee of this invention, Pitney-Bowes, Inc., Stamford, Conn.

The conversion unit 10 comprises a housing 13, (shown in a partial sectional view) containing a number (in this case 4) of high speed reversible motors 14 (mounted to the housing by any suitable means). Worm gear 15 forms part of each motor shaft 16. The worm gears 15 engage with, and rotatively drive gears 17, respectively.

Each gear 17 drives a spur gear 18 via a connecting shaft 19 suitably mounted within the housing. Each of the spur gears 18 engage with, and rotatively drive, respective gears 20 suitably mounted within the housing. The gears 20 are each respectively keyed to a corresponding drive wheel 21, which drives and supports an endless belt 25, respectively. Each belt 25 is supported by respective drive roller 21 and respective companion wheels 22, 23, and 24 as shown.

Each group of wheels 21, 22, 23, and 24, and corresponding belt 25 forms a belt mechanism. The portion 26 of each belt (between wheels 21 and 22) is supported in an arc by the arcuate base plate 27 which forms part of the housing 13. The arcuate belt portions 26 conform to the arcuate travel path (arrows 28) of the levers 12. Because of this comformity, each lever 12 is easily carried, and driven, by its respective belt 25. The tips 29 of each lever 12 project through an aperture 30 in the belt 25 (as typically shown). Thus, as each of the belts 25 are driven in either a clockwise or counterclockwise direction, the corresponding levers 12 will be driven to a new postage value position.

Each belt mechanism is monitored to determine its travel, or lever setting position, by means of timing marks (holes 31) in the upper belt portion 32. A photodetector unit 33 mounted adjacent the upper belt portion 32 counts the number of marks 31 moving past.

Because the belts 25 are flexible, they would each buckle in portion 26, when the drive (wheels 21) would be in a pushing or compressive mode, vis-a-vis, a tension or pulling mode. In order to prevent buckling, an additional pulley drive (shown generally by arrow 34) is provided for each belt mechanism. This pulley drive comprises bead chains 35 or timing belts (not shown) stretched between wheels 21 and 22. The pulley drive comprises a first sprocket wheel 36 rotatably affixed to gear 20. A first bead chain 35 links the rotative drive of gear 20 to an intermediary sprocket wheel 37. A second bead chain 35 connects the rotative drive of the sprocket wheel 37 with a sprocket wheel 38, that is rotatively fixed to wheel 22.

Thus, a constant tension is maintained upon each belt portion 26, no matter which direction each belt 25 is driven. As aforementioned, this constant tensioning between wheels 21 and 22, will prevent the belt portion 26 from buckling, thereby maintaining the arcuate conformity between the lever path (arrows 28) and the belt portion 26.

This conformity not only simplifies alignment of the levers with the belts, and makes for ease of assembly and disassembly of the unit via apertures 30, but it also allows for a more vertically compact unit. In other words, the unit is able to more closely approach or rest on top of the postage meter 11.

The motors 14 can be electrically actuated and controlled by a computer, computerized equipment, a scale having an electrical output, etc.

Having thus described the invention, it will be seen that the objects of invention have been met.

All obvious modifications and changes which will occur to the skilled practitioner in this art, are deemed to lie within the full scope, spirit and purview of the invention. What is desired to be covered by Letters Patent is presented in the appended claims.

What is claimed is:

1. A postage meter conversion apparatus for converting a lever settable mechanical postage meter into an electrically controlled postage meter, said postage meter having a number of banks, each bank having a lever movable in an arcuate path to set a postage value for said bank, the postage meter conversion apparatus comprising:

a drive motor for each postage meter bank; and a number of movably supported belt mechanisms each operatively connected to, and driven by, a respective driving motor, each of said belt mechanisms comprising an endless flexible belt and means for supporting a portion of each belt for movement in an arcuate path, said portion of each of said belts conforming to the arcuate path of a corresponding lever, each portion driving the corresponding lever of a meter bank to a postage value position.

2. The postage meter conversion apparatus of claim 1, wherein each flexible belt contains a coded section disposed over at least a portion thereof, and wherein each of said belt mechanisms further comprises a detector disposed adjacent a respective coded section for monitoring the displacement of the belt, and hence, the postage value position of a corresponding lever.

3. The postage meter conversion apparatus of claim 1, wherein the arcuately supported portion of each belt contains an aperture for receiving a tip portion of a corresponding lever.

4. The postage meter conversion apparatus of claim 1, wherein each said conversion apparatus further comprises a housing for said driving motors and said belt mechanisms, and wherein the means for supporting a portion of each belt for movement in an arcuate path comprises a portion of said housing.

5. The postage meter conversion apparatus fo claim 1, wherein said conversion apparatus further comprises tensioning means operatively connected to each of said belt mechanisms for providing a substantially uniform tension over the arcuately supported portion of each of said belts.

6. The postage meter conversion apparatus of claim 5, wherein said tensioning means comprises a pulleyed drive mechanism.

7. The postage meter conversion apparatus of claim 5, wherein said tensioning means provides a positive drive tension in either of two drive directions, whereby each respective belt will be prevented from buckling when the drive direction is reversed.

* * * * *